US011637887B2

United States Patent
Bouazizi et al.

(10) Patent No.: US 11,637,887 B2
(45) Date of Patent: Apr. 25, 2023

(54) PACKET TRANSMISSION PROTOCOL SUPPORTING DOWNLOADING AND STREAMING

(71) Applicant: Samsung Electronics Co., Ltd., Suwon-si (KR)

(72) Inventors: Imed Bouazizi, Frisco, TX (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/805,608

(22) Filed: Feb. 28, 2020

(65) Prior Publication Data

US 2020/0204609 A1 Jun. 25, 2020

Related U.S. Application Data

(63) Continuation of application No. 14/178,212, filed on Feb. 11, 2014, now abandoned.

(Continued)

(51) Int. Cl.
*H04L 67/06* (2022.01)
*H04N 21/238* (2011.01)
(Continued)

(52) U.S. Cl.
CPC ............. *H04L 67/06* (2013.01); *H04L 65/61* (2022.05); *H04L 65/70* (2022.05); *H04N 21/238* (2013.01);
(Continued)

(58) Field of Classification Search
CPC ......... H04L 65/4069; H04L 65/60–608; H04L 67/06; H04L 69/22; H04L 65/61;
(Continued)

(56) References Cited

U.S. PATENT DOCUMENTS 6,460,086 B1 10/2002 Swaminathan et al.
6,633,903 B1 * 10/2003 Gould .................... G06F 16/951
709/205

(Continued)

FOREIGN PATENT DOCUMENTS

CN 101395865 A 3/2009
CN 101682622 A 3/2010
(Continued)

OTHER PUBLICATIONS

"Information technology—High efficiency coding and media delivery in heterogeneous environments—Part 1: MPEG media transport (MMT)," ISO/IEC DIS 23008-1, Apr. 26, 2013, 92 pages, publisher ISO/IEC, Geneva, Switzerland. (Year: 2013).*

(Continued)

*Primary Examiner* — Mohamed A. Wasel

(57) ABSTRACT

A method and apparatus generate and process transport packets. A method of processing a transport packet at receiving entity includes identifying, in response to receiving the transport packet, a payload type based on a field indicating the payload type in a packet header for the transport packet. The method also includes identifying, in response to identifying that the payload type is a streaming mode payload type, a delivery data unit type of DU data in the transport packet based on a field indicating the delivery data unit type in a streaming mode payload header for the DU data. Additionally, the method includes processing the DU data according to the identified delivery data unit type.

3 Claims, 8 Drawing Sheets

Related U.S. Application Data

(60) Provisional application No. 61/896,570, filed on Oct. 28, 2013, provisional application No. 61/859,015, filed on Jul. 26, 2013.

(51) Int. Cl.
   *H04N 21/438* (2011.01)
   *H04N 21/6332* (2011.01)
   *H04L 65/61* (2022.01)
   *H04L 65/70* (2022.01)
   *H04L 69/22* (2022.01)

(52) U.S. Cl.
   CPC ....... *H04N 21/438* (2013.01); *H04N 21/6332* (2013.01); *H04L 69/22* (2013.01)

(58) Field of Classification Search
   CPC ...... H04L 65/70; H04N 21/238–23897; H04N 21/438–43856; H04N 21/6332–6338
   See application file for complete search history.

(56) References Cited

U.S. PATENT DOCUMENTS

| | | | |
|---|---|---|---|
| 2003/0018793 A1* | 1/2003 | Mora | H04L 47/10 709/230 |
| 2005/0190756 A1* | 9/2005 | Mundra | H04L 65/607 370/389 |
| 2007/0153830 A1* | 7/2007 | Xhafa | H04W 28/06 370/470 |
| 2007/0242701 A1 | 10/2007 | Lee et al. | |
| 2008/0013542 A1 | 1/2008 | Youm et al. | |
| 2008/0040498 A1 | 2/2008 | Setlur et al. | |
| 2008/0115063 A1* | 5/2008 | Glenn | G11B 27/036 715/728 |
| 2008/0134266 A1 | 6/2008 | Kang | |
| 2008/0240123 A1* | 10/2008 | Cutaia | H04L 65/103 370/401 |
| 2009/0003247 A1 | 1/2009 | Katis et al. | |
| 2009/0022137 A1 | 1/2009 | Aghili et al. | |
| 2009/0052537 A1* | 2/2009 | Burazerovic | G06K 9/3233 375/240.15 |
| 2011/0205972 A1 | 8/2011 | Yuk et al. | |
| 2012/0163378 A1 | 6/2012 | Kim et al. | |
| 2013/0013982 A1 | 1/2013 | Hwang et al. | |
| 2013/0094545 A1 | 4/2013 | Park et al. | |
| 2013/0094563 A1* | 4/2013 | Bae | H04L 12/1868 375/240.01 |
| 2013/0110344 A1* | 5/2013 | Merg | G07C 5/0825 701/31.4 |
| 2013/0136193 A1 | 5/2013 | Hwang et al. | |
| 2013/0152121 A1 | 6/2013 | Bartel-Kurz et al. | |
| 2013/0166855 A1* | 6/2013 | Batwara | G06F 9/5016 711/154 |
| 2014/0007172 A1* | 1/2014 | Rhyu | H04N 21/2362 725/109 |
| 2014/0133489 A1* | 5/2014 | Bae | H04L 47/34 370/392 |
| 2014/0280717 A1* | 9/2014 | Frost | H04L 67/10 709/217 |
| 2014/0282799 A1* | 9/2014 | Bae | H04N 21/64322 725/116 |
| 2014/0313966 A1* | 10/2014 | Shukla | H04W 48/10 370/312 |
| 2014/0344875 A1* | 11/2014 | Bae | H04N 21/234327 725/109 |
| 2014/0369222 A1 | 12/2014 | Kim et al. | |
| 2015/0032845 A1* | 1/2015 | Bouazizi | H04N 21/6332 709/217 |
| 2015/0089560 A1 | 3/2015 | Park et al. | |
| 2015/0113577 A1* | 4/2015 | Yie | H04N 21/47202 725/109 |
| 2015/0146797 A1* | 5/2015 | Lee | H04N 21/23614 375/240.25 |
| 2015/0150056 A1 | 5/2015 | Kim et al. | |
| 2015/0181003 A1* | 6/2015 | Kim | H04L 69/22 370/474 |
| 2015/0201207 A1* | 7/2015 | Yie | H04N 19/463 375/240.26 |
| 2015/0373380 A1* | 12/2015 | Tsukagoshi | H04L 5/22 725/109 |
| 2016/0044532 A1* | 2/2016 | Champel | H04N 19/40 370/329 |
| 2016/0073119 A1* | 3/2016 | Toma | H04N 19/70 375/240.02 |
| 2016/0073137 A1* | 3/2016 | Dewa | H04N 21/236 725/116 |
| 2016/0080714 A1* | 3/2016 | Tsukagoshi | H04N 5/38 348/453 |
| 2016/0112731 A1* | 4/2016 | Tsukagoshi | H04L 65/608 725/109 |
| 2017/0324509 A1 | 11/2017 | Herrmann et al. | |

FOREIGN PATENT DOCUMENTS

| | | |
|---|---|---|
| CN | 102577268 A | 7/2012 |
| CN | 102598624 A | 7/2012 |
| CN | 103155454 A | 6/2013 |
| CN | 104303507 A | 1/2015 |
| EP | 3273661 A2 | 1/2018 |
| JP | 2002281456 A | 9/2002 |
| JP | 2002532009 A | 9/2002 |
| JP | 2009543504 A | 12/2009 |
| JP | 2013520850 A | 6/2013 |
| KR | 20050066954 A | 6/2005 |
| KR | 20110019404 A | 2/2011 |
| KR | 20110022017 A | 3/2011 |
| KR | 20120138687 A | 12/2012 |
| KR | 101530825 B1 | 6/2013 |
| WO | 2009045051 A2 | 4/2009 |
| WO | 2013055176 A1 | 4/2013 |
| WO | 2013055182 A1 | 4/2013 |
| WO | 2013077662 A1 | 5/2013 |

OTHER PUBLICATIONS

European Patent Office Summons to attend oral proceedings pursuant to Rule 115(1) EPC regarding Application No. 14828733.7, dated Feb. 26, 2020, 9 pages.
Bouazizi et al., "Restructuring of MMTP Protocol", 105. MPEG Meeting; Jul. 29, 2013-Aug. 2, 2013; Vienna; (Motion Picture Expert Group or ISO/IEC JTC1/SC29/WG11) No. m30555, Aug. 2013, XP030059082, 18 pages.
International Search Report dated Nov. 3, 2014 in connection with International Patent Application No. PCT/KR2014/006829.
Written Opinion of the International Searching Authority dated Nov. 3, 2014 in connection with International Patent Application No. PCT/KR2014/006829.
Decision of Grant dated Mar. 20, 2015 in connection with Korean Patent Application No. 10-2014-0094980; 6 pages.
Japanese Examination Report dated Aug. 24, 2015 in connection with Japanese Patent Application No. 2015-535594; 5 pages.
European Patent Office, "Supplementary European Search Report," Application No. 14828733.7-1908, dated Dec. 13, 2016, 9 pages, publisher EPO, Munich, Germany.
XP030020266, "Information technology—High efficiency coding and media delivery in heterogeneous environments—Part 1: MPEG media transport (MMT)," ISO/IEC DIS 23008-1, Apr. 26, 2013, 92 pages, publisher ISO/IEC, Geneva, Switzerland.
The First Office Action regarding Chinese Patent Application No. 201480042072.0, dated Feb. 14, 2018, 20 pages.
Notice of Allowance dated Apr. 24, 2018 in connection with Japanese Patent Application No. 2017-042254.
The Korean Intellectual Property Office, "Notification of the Reasons for Rejection," Application No. KR10-2015-0000130, dated Dec. 13, 2018, 5 pages.
Notice of Allowance dated Apr. 23, 2019 in connection with Japanese Patent Application No. 2018-099982, 6 pages.

(56) References Cited

OTHER PUBLICATIONS

"Information technology—High efficiency coding and media delivery in heterogeneous environments—Part 1: MPEG media transport (MMT)," 2012, ISO.

Zhu, C. "RTP payload format for H. 263 video streams." (1997).

China National Intellectual Property Administration, "The First Office Action" in connection with Chinese Patent Application No. 201911248319.5, dated Sep. 3, 2021, 11 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            item_ID                            |
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           message_id          |    VERSION    |      RES      |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LENGTH             |S|H|L|B|  CP   |I|M|    RES    |
+-+-+-+-+-+-+-+-+-+-+-+-+-+-+-+-+-+-+-+-+-+-+-+-+-+-+-+-+-+-+-+-+
|                start_offset (length=16+16*H+32*S)             |
+-+-+-+-+-+-+-+-+-+-+-+-+-+-+-+-+-+-+-+-+-+-+-+-+-+-+-+-+-+-+-+-+
|                   GENERIC FILE DELIVERY PAYLOAD               |
+-+-+-+-+-+-+-+-+-+-+-+-+-+-+-+-+-+-+-+-+-+-+-+-+-+-+-+-+-+-+-+-+
```

FIG. 8

PACKET TRANSMISSION PROTOCOL SUPPORTING DOWNLOADING AND STREAMING

CROSS-REFERENCE TO RELATED APPLICATION(S) AND CLAIM OF PRIORITY

This application is a continuation of U.S. patent application Ser. No. 14/178,212, filed Feb. 11, 2014, which claims priority to U.S. Provisional Patent Application No. 61/859,015, filed Jul. 26, 2013, and U.S. Provisional Patent Application No. 61/896,570, filed Oct. 28, 2013. The contents of the above-identified patent documents are incorporated herein by reference.

TECHNICAL FIELD

The present application relates generally to media data transmission and, more specifically, to a packet transmission protocol that supports both downloading and streaming.

BACKGROUND

Moving Picture Experts Group (MPEG) media transport (MMT) is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

A new packetization mode, the Generic File Delivery (GFD) mode, has been introduced to the MMT delivery function. However, the integration of that mode into MMTP and with the existing payload modes has not been optimized.

Accordingly, there is a need for improved apparatuses and methods for media data transmission.

SUMMARY

Embodiments of the present disclosure provide a method and apparatus generate and process transport packets using a packet transmission protocol capable of supporting downloading and streaming.

In one exemplary embodiment, a method of processing a transport packet at receiving entity is provided. The method includes identifying, in response to receiving the transport packet, a payload type based on a field indicating the payload type in a packet header for the transport packet. The method also includes identifying, in response to identifying that the payload type is a streaming mode payload type, a delivery data unit type of data unit (DU) data in the transport packet based on a field indicating the delivery data unit type in a streaming mode payload header for the DU data. Additionally, the method includes processing the DU data according to the identified delivery data unit type.

In another exemplary embodiment, a method of generating a transport packet by a sending entity is provided. The method includes generating the transport packet to include an identifier of a payload type in a field indicating the payload type in a packet header for the transport packet. The method also includes including, when the payload type is an streaming mode payload type, an identifier of a delivery data unit type of DU data for the transport packet in a field indicating the delivery data unit type in a streaming mode payload header for the DU data. Additionally, the method includes sending the transport packet.

In yet another exemplary embodiment, an apparatus in a receiving entity capable of processing a transport packet is provided. The apparatus includes a receiver configured to receive the transport packet. Additionally, the apparatus includes processing circuitry configured to identify a payload type based on a field indicating the payload type in a packet header for the transport packet, identify, in response to identifying that the payload type is an streaming mode payload type, a delivery data unit type of DU data in the transport packet based on a field indicating the delivery data unit type in a streaming mode payload header for the DU data, and process the DU data according to the identified delivery data unit type.

In another exemplary embodiment, an apparatus in a sending entity capable of generating a transport packet is provided. The apparatus includes processing circuitry configured to generate the transport packet to include an identifier of a payload type in a field indicating the payload type in a packet header for the transport packet, and include, when the payload type is an streaming mode payload type, an identifier of a delivery data unit type of DU data for the transport packet in a field indicating the delivery data unit type in a streaming mode payload header for the DU data. Additionally, the apparatus includes a transmitter configured to send the transport packet.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an exemplary structure for a non-timed MFU header in accordance with various embodiments of the present disclosure;

FIG. 7 illustrates an exemplary structure for a signaling message header in accordance with various embodiments of the present disclosure;

FIG. 8 illustrates an exemplary structure for a GFD mode packet structure in accordance with various embodiments of the present disclosure;

DETAILED DESCRIPTION

Figure 1:
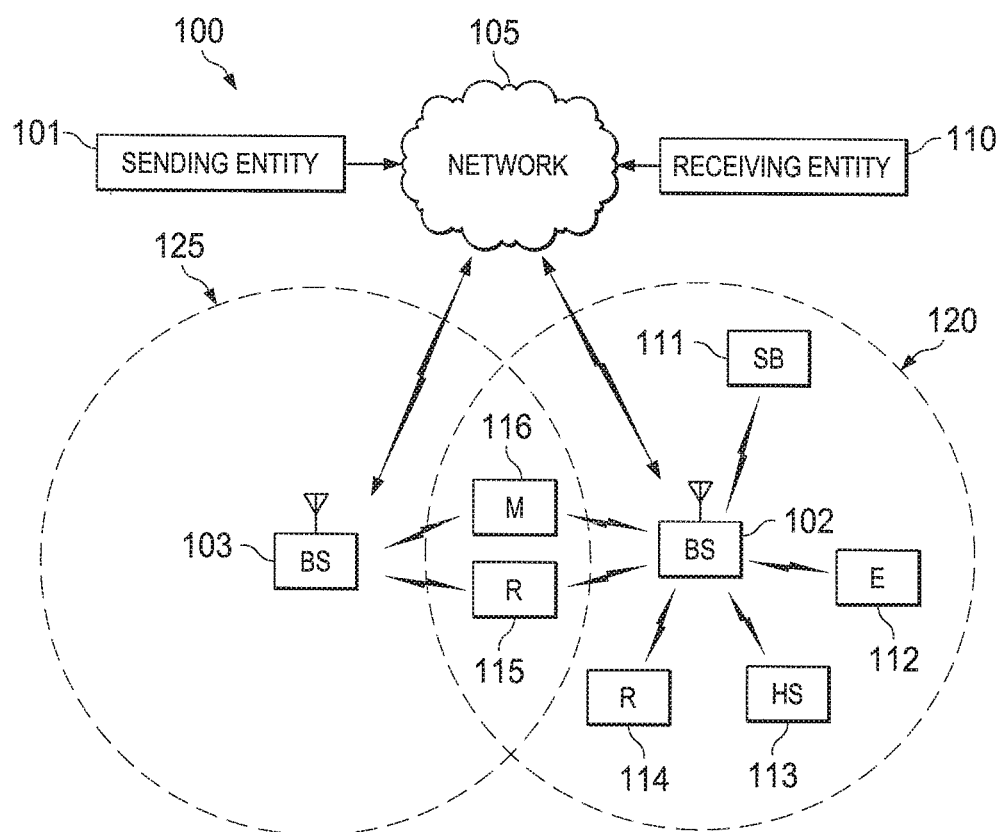
FIG. 1 illustrates an example of a transmission system in which various embodiments of the present disclosure may be implemented.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

MMT coding and media delivery is discussed in the following document and standards description: MPEG-H Systems, Text of ISO/IEC 2nd CD 23008-1 MPEG Media Transport, which is hereby incorporated into the present disclosure as if fully set forth herein. MMT defines three functional areas including encapsulation, delivery, and signaling. The encapsulation functional area defines the logical structure of media content, the MMT package, and the format data units to be processed by an MMT compliant entity. MMT package specifies components including media content and the relationship among the media content to provide information needed for adaptive delivery. The format of the data units is defined to encapsulate the coded media to either be stored or carried as a payload of a delivery protocol, and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package and messages for delivery management are used signal the structure of payload format and configuration of the protocol.

MMT defines a new framework for delivery of time continuous multimedia such as audio, video and other static content such as widgets, files etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Embodiments of the present disclosure recognize that a new packetization mode, the GFD mode, has been introduced to the MMT delivery function. GFD enables the transmission of any generic file. Embodiments of the present disclosure recognize that presently MMT defines 4 other packetization modes: the media processing unit (MPU) mode, the MPU Fragment mode, Signaling Message mode, and forward error correction (FEC) mode. The MPU mode delivers a complete MPU and leaves fragmentation to the transport layer. The MPU Fragment mode is optimized for MPU delivery and packetization is performed in a media-aware manner, informing the receiving client about the MPU fragment type and characteristics. The FEC and signaling modes are for delivering FEC repair packets and signaling messages, respectively.

Embodiments of the present disclosure recognize that the MPU mode may be seen as a sub-case of the GFD mode, since the whole MPU is delivered as an object and without any media-aware packetization. The information about the MPU can be fully delivered as part of the metadata of the object in the GFD mode. Consequently, embodiments of the present disclosure provide to remove the MPU mode and rename the MPU Fragment mode into the MPU mode for disambiguation. As a result, an MPU may be delivered either as a generic object using the GFD mode or as a set of independent fragments using this MPU mode.

Embodiments of the present disclosure recognize that presently the payload format of a packet is split over multiple layers. A main payload header is needed for each payload format and has a one-to-one mapping to the MMTP protocol header. Embodiments of the present disclosure recognize to merge this generic payload header with the MMTP protocol header and make the remaining payload headers dependent on the payload type. For example, fragmentation and aggregation are also dependent on the payload type, as some payload types, e.g. FEC and GFD, do not require aggregation and fragmentation. Embodiments of the present disclosure further provide a payload type for signaling messages enable easy identification of signaling messages and updates. The payload format will also enable aggregation and fragmentation of signaling messages.

FIG. 1 illustrates an example of a transmission system 100 in which various embodiments of the present disclosure may be implemented. In the illustrated embodiment, wireless system 100 includes a sending entity 101, a network 105, receiving entities, 110-116, wireless transmission points (e.g., an Evolved Node B (eNB), Node B), such as base station (BS) 102, base station (BS) 103, and other similar base stations or relay stations (not shown). Sending entity 101 is in communication with base station 102 and base station 103 via network 105 which may be, for example, the Internet, a media broadcast network, or IP-based communication system. Receiving entities 110-116 are in communication with sending entity 101 via network 105 and/or base stations 102 and 103. For example, receiving entities 110-116 may receive media data for downloading and streaming from sending entity 101. In various embodiments, the sending entity 101 may generate and send MMTP packets and one or more of the receiving entities 110-116 may receive and process the MMTP packets in accordance with the teachings of present disclosure.

Base station 102 provides wireless access (via base station 101) to network 105 to a first plurality of receiving entities (e.g., user equipment, mobile phone, mobile station, subscriber station) within coverage area 120 of base station 102. The first plurality of receiving entities includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless communication enabled laptop, a wireless communication enabled PDA, a tablet computer, or the like.

Base station 103 provides wireless access to network 105 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that system 100 may provide wireless broadband and network access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access media data voice, data, video, video conferencing, and/or other services via network 105. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

Figure 2:
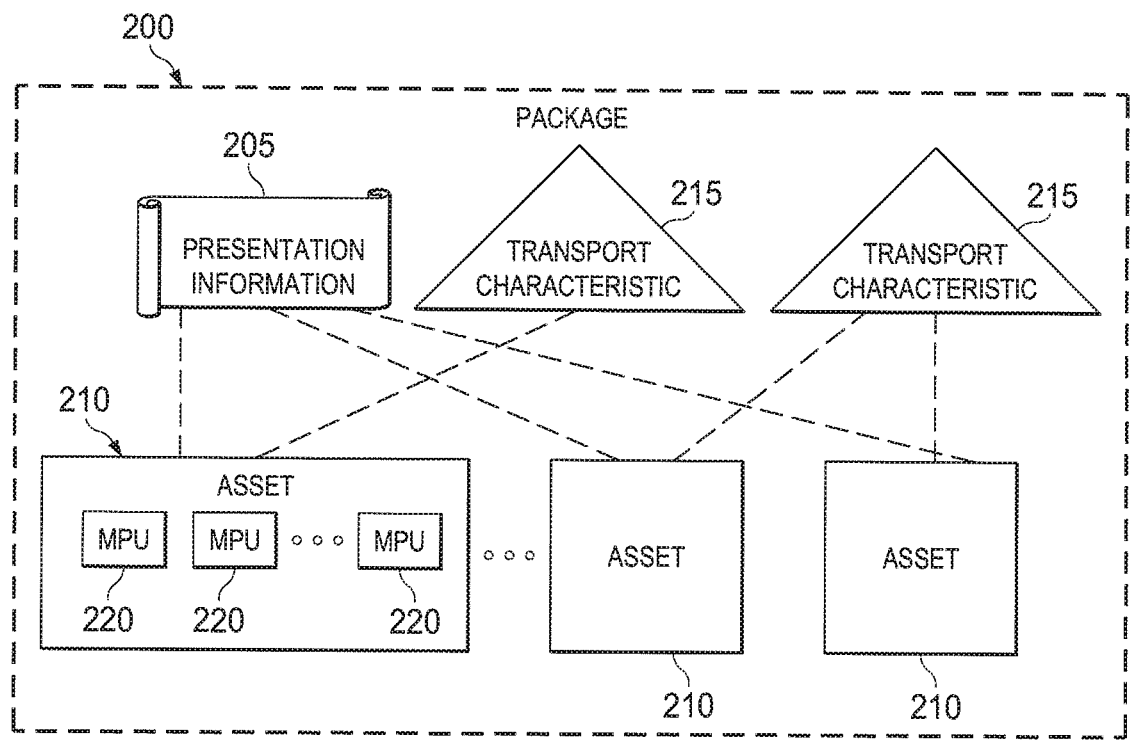
FIG. 2 illustrates an MMT Package and the logical structure of the MMT Package in accordance with various embodiments of the present disclosure.

FIG. 2 illustrates an MMT Package 200 and the logical structure of the MMT package 200 in accordance with various embodiments of the present disclosure. As illustrated, the MMT package 200 includes presentation one or more information documents 205 and one or more assets 210 that may have associated transport characteristics 215. An asset 210 is a collection of one or more media processing units (MPUs) 220 that share a same asset identification (ID). An asset 210 includes encoded media data such as audio or video, or a web page. The media data can be either timed or non-timed.

Presentation information (PI) documents 205 include information specifying the spatial and temporal relationship among the assets 210 for consumption. The combination of hypertext markup language (HTML) and composition information (CI) documents are examples of PI documents 205. A PI document 205 may also be used to determine a delivery order of assets 210 in a package 200. A PI document 205 is delivered either as one or more messages or as a complete document. In the case of broadcast delivery, service providers may circulate presentation information documents 205 sequentially and determine a frequency at which circulation is to be performed.

An asset 210 is any multimedia data to be used for building a multimedia presentation. As discussed above, an asset 210 is a logical grouping of MPUs that share a same asset ID for carrying encoded media data. Encoded media data of an asset 210 can be either timed data or non-timed data. Timed data are encoded media data that have an inherent timeline and may require synchronized decoding and presentation of the data units at a designated time. Non-timed data are other types of data that can be decoded at an arbitrary time based on the context of a service or indications from the user.

MPUs 220 of a single asset 210 have either timed or non-timed media. Two MPUs 220 of the same asset 210 carrying timed media data may have no overlap in their presentation time. In the absence of a presentation indication, MPUs 220 of the same asset 210 may be played back sequentially according to their sequence numbers. Any type of media data which can be individually consumed by the presentation engine of an MMT receiving entity may be considered as an individual asset 210. Examples of media data types which can be considered as an individual asset 210 are audio, video, or a web page media data types.

An MPU 220 is a media data item that may be processed by an MMT entity and consumed by a presentation engine independently from other MPUs 220. Processing of an MPU 220 by an MMT entity includes encapsulation/decapsulation and packetization/depacketization. Consumption of an MPU 220 includes media processing (e.g. encoding/decoding) and presentation. For packetization purposes, an MPU 220 may be fragmented into data units that may be smaller than an access unit (AU). The syntax and semantics of MPU are not dependent on the type of media data carried in the MPU.

An MPU 220 may include a portion of data formatted according to other standards, e.g. MPEG-4 advanced video coding (AVC) or MPEG-2 transport stream (TS). For any asset with asset identification (asset_id) 'X' that depends on an asset with asset_id 'Y', the $m^{th}$u of the asset with asset_id 'X' and the $n^{th}$ MPU of the asset with asset_id 'Y' are non-overlapping whenever 'm' is not equal to 'n', (i.e. no sample in the $m^{th}$ MPU of Asset with asset_id 'X' is inside the time interval defined by the sample boundaries of the nth MPU of Asset with asset_id 'Y'. Additionally, if the segment index ('sidx') box is present, the media intervals defined by the 'sidx' box is non-overlapping, (i.e. no media sample in the $k^{th}$ media interval (defined by the 'sidx' box) in an MPU is inside the time interval defined by the sample boundaries of the $j^{th}$ media time interval (defined by the 'sidx' box) for T different from 'k'. In the absence of an 'sidx' box, the concatenation of the $j^{th}$ MPU of the MPU of Asset with asset_id 'Y' with the $j^{th}$ MPU of the asset with asset_id 'X' without MPU metadata, results in a valid MPU. When an 'sidx' box is present the concatenation of the $k^{th}$ media interval (defined by the 'sidx' box) of the $j^{th}$ MPU of asset with asset_id 'Y' with the $k^{th}$ media interval (defined by the 'sidx' box) of the $j^{th}$ MPU of the asset with asset_id 'X' following the metadata of the MPU with asset_id 'Y' results in a valid MPU.

A single MPU includes an integral number of AUs or non-timed data. In other words, for timed data, a single AU is not fragmented into multiple MPUs. For non-timed data, a single MPU includes one or more non-timed data items to be consumed by presentation engine. An MPU is identified by an associated asset_id and a sequence number.

An MPU that includes timed media includes at least one stream access point (SAP) as defined in Annex I of ISO/IEC 14496-12, which is incorporated by reference herein. The first access unit of an MPU is a SAP for processing by an MMT entity. For timed media, this implies that the decoding order of the first AU in the MPU payload is '0'. For the MPU including data formatted according to other standards, the MPU payload starts with the information necessary for the processing of such a format. For example, if an MPU includes video data, the MPU payload includes one or more groups of pictures and the decoder configuration information required to process them. In another example, if an MPU includes MPEG-2 TS packets, the MPU payload may start with TS packets including program association table (PAT) program map table (PMT) for the remaining or subsequent TS packets. For timed media data, the presentation duration, the decoding order, and the presentation order of each AU are signaled as part of the MPU metadata. The MPU does not have an initial presentation time. The presentation time of the first AU in an MPU is described by the PI document. The PI document includes information specifying the initial presentation time of each MPU.

Figure 3:
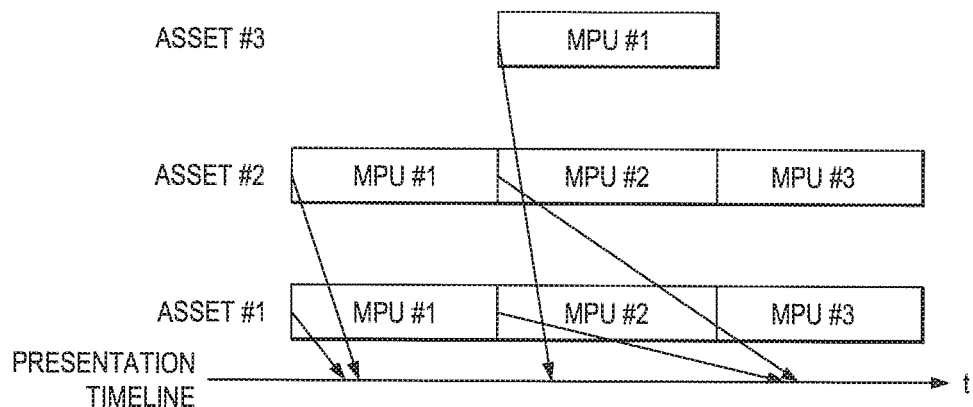
FIG. 3 illustrates an example of timing provided by a presentation information document for presentation of MPUs from different assets in accordance with an illustrative embodiment of the present disclosure.

FIG. 3 illustrates an example of timing provided by a PI document for presentation of MPUs from different assets in accordance with an illustrative embodiment of the present disclosure. In this illustrative example, the PI document specifies that the MMT receiving entity shall present MPU #1 of Asset #1 and of Asset #2 simultaneously. At a later point, MPU #1 from Asset #3 is scheduled to be presented. Finally, MPU #2 of Asset #1 and Asset #2 are to be presented in synchronization. The specified presentation time for an MPU defines the presentation time of the first AU of that MPU. An MPU that contains non-timed media data may designate one data item as the entry point.

MFUs enable media-aware fragmentation of an MPU for transportation purposes. This allows an MMT sending entity to perform fragmentation of MPUs with consideration for consumption at the receiving end. An MFU includes a media data unit, that may be smaller than an AU for timed media data, and the included media data may be processed by the media decoder. An MFU includes an MFU header that includes information on the boundaries of the carried media data. The syntax and semantics of MFU are independent of the type of media data carried in the MFU. If the size of an MFU is bigger than the size of a link layer frame, an MFU may be fragmented into multiple link layer frames. An MFU includes an identifier to distinguish one MFU from another in the same MPU as well as relationship information among MFUs within a single AU in a manner that is agnostic to the encoded media format. The dependency relationship among MFUs in a single AU is described as are the relative priorities of MFUs. The information can be used by underlying delivery layers for enhanced delivery. For example, the delivery layer can skip delivery of discardable MFUs to support QoS under certain circumstances, e.g. insufficient bandwidth on certain links in the network.

In accordance with the various embodiments of the present disclosure, an MMT payload is a generic payload used to packetize and carry assets, generic objects, and other information for consumption of a MMT package using the MMT protocol (MMTP). The MMT payload may be used to packetize MPUs, generic objects, and signaling messages. The MMT payload may carry fragments of MPUs, signaling messages, generic objects (including complete MPUs), repair symbols, etc. The type of the payload is indicated by the type (or object type) field in the MMTP packet header, as will be discussed in greater detail with the discussion of FIG. 9 below. For each payload type, a single data unit for delivery, as well as a type specific payload header, are defined. For example, a fragment of an MPU (e.g. an MFU) is considered as a single data unit when MMT payload carries MPU fragments. The MMT protocol may aggregate multiple data units with the same data type into a single payload. It can also fragment a single data unit into multiple packets.

The MMT payload consists of a payload header and payload data. Some data types may allow for fragmentation and aggregation, in which case, a single data unit is split into multiple fragments or a set of data units are delivered in a single packet. Each data unit may have its own payload header depending on the type of the payload. For types that do not require a payload type-specific header no payload type header is present and the payload data follows the MMTP header. Some fields of the MMTP packet are interpreted differently based on the payload type. The semantics of these fields are defined by the payload type in use.

Figure 4:
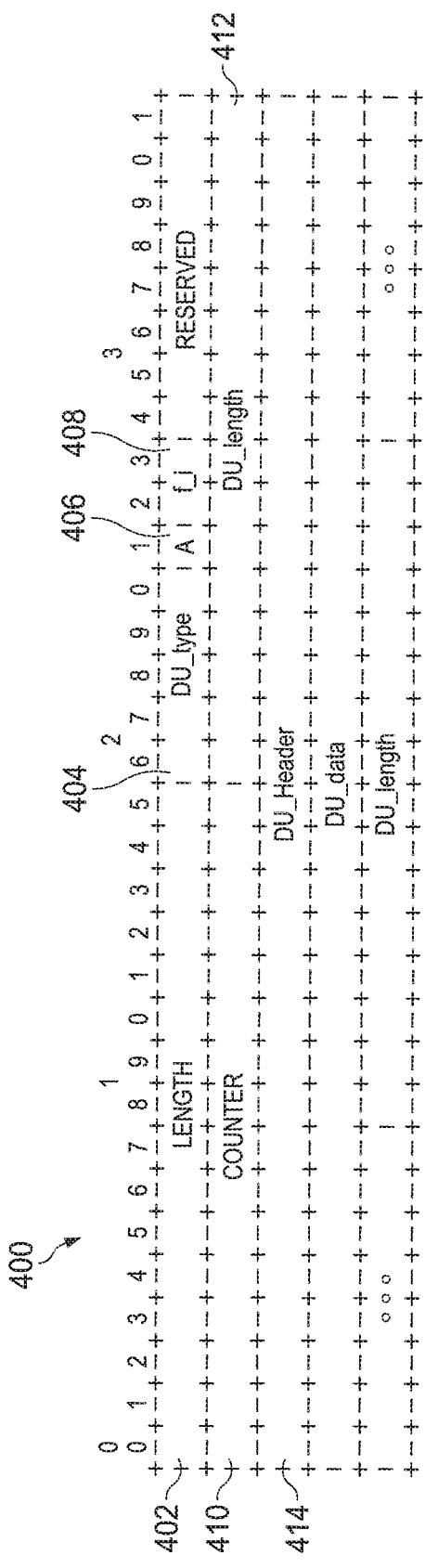
FIG. 4 illustrates an exemplary structure for a streaming mode payload header in accordance with various embodiments of the present disclosure.

FIG. 4 illustrates an exemplary structure for a streaming mode payload header 400 in accordance with various embodiments of the present disclosure. The delivery of MPUs to MMT receivers using MMT protocol requires a packetization and depacketization procedure to take place at the sender and receiver, respectively, to enable the delivery of large MPUs. The MPU delivery mode considers a complete MPU or specific subparts of a single MPU as independent delivery data units for packetization or aggregation to facilitate large variances of size of MPUs. The streaming mode of MMTP payload format (e.g., MPU mode) allows fragmentation of single delivery data units into multiple MMTP payloads to support delivery of MPU with a large size. The streaming mode also allows aggregation of multiple delivery data units with same type into a single MMTP payload, to cater for smaller data units. The packetization procedure may transform an MPU into a set of MMTP payloads that are then carried in each MMTP packets when it is fragmented. At the receiving entity depacketization is performed to recover the original MPU data.

In payload type 0x00, the MPU is fragmented in a media-aware manner allowing the transport layer to identify the nature and priority of the fragment that is carried. A fragment of an MPU may be, for example, MPU metadata, or a Movie Fragment metadata, an MFU, or a non-timed data item. This streaming mode is also used for the delivery of signaling messages or recovery symbols.

In this exemplary embodiment, streaming mode payload header 400 semantics and length of each field of the streaming mode payload header 400 are provided as follows: length field 402 has a length of 16 bits and this field indicates the size of entire payload including this field; the delivery Data Unit Type (DU_type) field 404 is 5 bits long and indicates the delivery data unit type of the payload, for example, as provided by Table 1 below.

TABLE 1

Delivery Data Unit Types

| value | Description | Content |
|---|---|---|
| 0 | Complete MPU | a single complete MPU as a single delivery data unit |
| 1 | MPU metadata | the ftyp, mmpu, and moov boxes as well as any other boxes that appear in between as a single delivery data unit - no delivery data unit header is used |
| 2 | Movie fragment metadata | the moof box and the mdat box, excluding all media data inside the mdat box as a single delivery data unit. No delivery data unit header is used |
| 3 | Timed_MFU | a sample or sub-sample of timed media data as a single delivery data unit - delivery data unit header discussed with regard to FIG. 5 may be used |
| 4 | Non-timed_MFU | an item of non-timed media data as a single delivery data unit - delivery data unit header discussed with regard to FIG. 6 may be used |
| 5 | Signaling message | a single complete signaling message as a delivery data unit. No delivery data unit header is used - delivery data unit header discussed with regard to FIG. 7 may be used |
| 6 | Recovery symbols | a single complete recovery symbol as a delivery data unit - no delivery data unit header is used. |
| 7~11 | Reserved | |

Continuing with the fields of the streaming mode payload header 400, the aggregation_flag (A) field 406 is 1 bit long and when set to '1' indicates that more than 1 delivery data unit is present in the payload that the f_i field 408 is ignored; the fragmentation indicator (f_i) field 408 is 2 bits long and indicates the fragmentation indicator contains information about fragmentation of data unit in the payload, for example, as illustrated in Table 2 below.

TABLE 2

Value of fragmentation indicator

| Value | Description |
|---|---|
| 00 | Payload contains one or more delivery data unit headers and complete delivery data units. |
| 01 | Payload contains the delivery data unit header and the first fragment of delivery data unit |
| 10 | Payload contains a fragment of delivery data unit that is neither the first nor the last part. |
| 11 | Payload contains the last fragment of delivery data unit. |

The value of this field 408 may be set to '00' when the value of the field 'A' is set to '1'.

Continuing with the fields of the streaming mode payload header 400, the counter (counter) field 410 is 16 bits, indicates a number of payload containing fragments of same delivery data unit succeeding this MMT payload if the aggregation_flag is set to '0', and indicates the number of delivery data units aggregated in this payload if aggregation_flag is set to '1'. The DU_length field 412 is 16 bits long and field indicates the length of the data following this field 412. When aggregation_flag is set to '0', this field 412 may not be present. When aggregation_flag is set to '1', this field 412 may appear as many times as the value of the 'counter' field 410 and preceding each aggregated data unit. The DU_Header field 414 is the header of the data unit, which depends on the type of delivery data unit, as will be discussed in greater detail below. When aggregation_flag is set to '1', this field 414 may appear as many times as the value of the 'counter' field 410 and preceding each aggregated delivery data unit. When aggregation_flag is set to '0', this field 414 may appear when the value of the 'f_i' field 408 is '01'.

Figure 5:
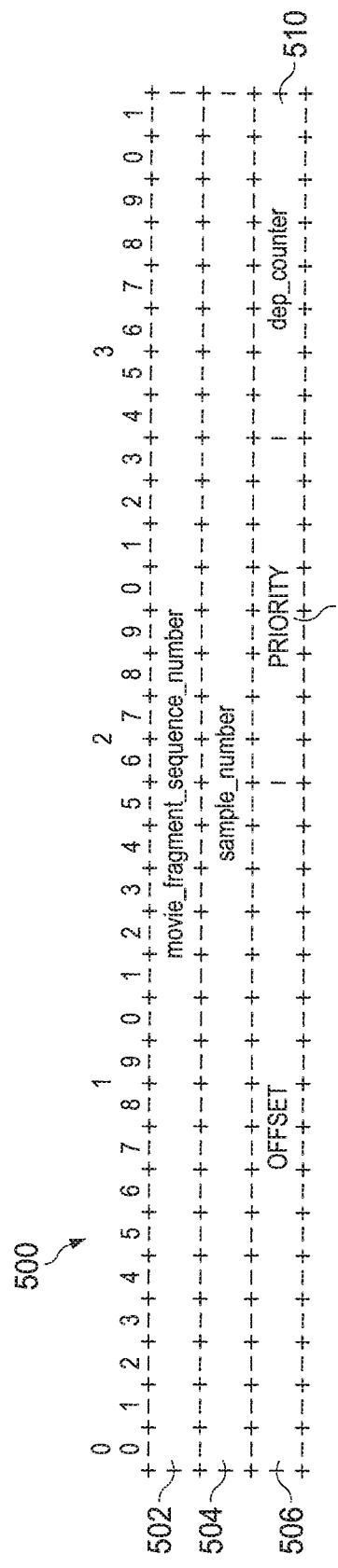
FIG. 5 illustrates an exemplary structure for a timed media fragment unit (MFU) header in accordance with various embodiments of the present disclosure.

FIG. 5 illustrates an exemplary structure for a timed-media MFU header 500 in accordance with various embodiments of the present disclosure. The timed-media MFU header 500 is one example of delivery data unit header, such as included in the DU_header 414 in FIG. 4, for timed media data.

In this exemplary embodiment, the semantics and length of each field of the timed-media MFU header 500 are provided as follows: the movie_fragment_sequence_number field 502 is 32 bits long and includes the sequence number of the movie fragment to which the media data of this MFU belongs; the sample_number field 504 is 32 bits long and includes the sample number of the sample to which the media data of the MFU; the offset field 506 is 16 bits long and includes the offset of the media data of this MFU inside the referenced sample; the subsample_priority field 508 is 8 bits long and provides the priority of the media data carried by this MFU compared to other media data of the same MPU. For example, the value of subsample_priority may be between 0 and 455, with higher values indicating higher priority. Additionally, the dependency_counter field 510 is 8 bits long and indicates the number of data units that depend on their media processing upon the media data in this MFU.

FIG. 6 illustrates an exemplary structure for a non-timed MFU header 600 in accordance with various embodiments of the present disclosure. The non-timed MFU header 600 is one example of delivery data unit header, such as included in the DU_header 414 in FIG. 4, for non-timed media data.

In this exemplary embodiment, the semantics and length of each field of the non-timed MFU header 600 are provided as follows: the Item ID field 60 is 32 bits long and includes the identifier of the item that is carried as part of this MFU. For the file types (FTs) 0 and 1, no additional DU header may be available. The object identifier field of the MMTP header may be set to the MPU_sequence_number of the MPU from which the data unit is extracted. The random access point (RAP) flag may be set to mark data units of FT value 0 and 1 and for MFUs that contain a sync sample or a fragment thereof, in the case of timed media, and for the primary item of non-timed MPUs.

FIG. 7 illustrates an exemplary structure for a signaling message header 700 in accordance with various embodiments of the present disclosure. The signaling message header 700 is one example of delivery data unit header, such as included in the DU_header 414 in FIG. 4, for a signaling message.

In this exemplary embodiment, the semantics and length of each field of the signaling message header 700 are provided as follows: the message_id field 702 is 16 bits long and indicates the type of the signaling message; the version field is 8 bits long and indicates the version number of the signaling message; the reserved (RES) field is 8 bits long and is reserved for future use and may be set to 0.

MMTP also supports the transport of generic files and assets and uses payload type 1. A generic asset consists of one or more files that are logically grouped and that share some commonality for an application, e.g. Segments of a Dynamic Adaptive Streaming over HTTP (DASH) Representation, a sequence of MPUs, etc.

In the GFD payload type mode, a generic asset is delivered through MMTP using the GFD payload type. GFD requires a GFD session description discussed below to describe the generic asset contents and delivery characteristics. Embodiments of the present disclosure provide the establishment of GFD session over the MMTP protocol. When delivered within MMTP, GFD session may be mapped on exactly one packet_id flow.

Each file delivered within a GFD session requires association of transport delivery information. This includes, but is not limited to information such as the transfer length. Each file delivered within a GFD session may also have associated content specific parameters such as name, identification, and/or location of the file, media type, size of the file, encoding of the file or message digest of the file. In alignment with HTTP/1.1 protocol as defined in IETF RFC2616, which is incorporated by reference herein, each file within one generic asset may have assigned any meta-information about the entity-body, i.e. the delivered file. Additional details of the GFD operation discussed below. The files delivered in a GFD session may have to be made available to an application, for example through a proxy cache or by other means. Each object is then delivered through the GFD session.

Before a receiver can establish a GFD session, the receiver may need to obtain sufficient information, such as, for example, session access information and GFD session Information. The session access information for the GFD session, when operating in MMT, is defined in 23008-1, which has been incorporated by reference herein. The GFD session information is described in greater detail below. The GFD Session Description could be in a form such as the Session Description Protocol (SDP) as defined in RFC4566, XML metadata as defined in RFC3023, or HTTP/MIME headers as defined in RFC2616, etc., each of these RFC standards are expressly incorporated by reference herein.

GFD Session Information: the GFD protocol delivers files. In the GFD mode, each file is assigned a Transmission Object Identifier (TOI) parameter and a code point (CP) parameter. The TOI parameter provides that object is associated with a unique identifier within the scope of a GFD session. Each object is associated with a code point. A code point summarizes specific object and object delivery properties. Packets with the same TOI may have the same value in the code point.

The GFD table provides a list of code points. Each code point is dynamically assigned a code point value. Semantics of the GFD Table are provided in Table 3 below.

TABLE 3

GFD Table

| Element or Attribute Name | Use | Description |
|---|---|---|
| GFDTable | | The element carries a GFDTable |
| CodePoint | 1 . . . N | defines all Code Points in the GFD session |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @

A code point may include the maximum transfer length of any object delivered with this code point signaling. In addition, a code point may include any of the following information: the actual transfer length of the objects, any information that may be present in the entity-header as defined in RFC2616, section 7.1, incorporated by reference herein, a content-location-template as described below using the TOI and packet_id parameter, if present; and specific information on the content, for example how the content is packaged, etc. The TOI and packet_id may be used to generate the content-location for each TOI and packet_id. If such a template is present, the processing as described below regarding the content-location template may be used to generate the content-location and the value of the URI may be treated as the content-location field in the entity-header. Within one session, at most 256 code points may be defined. The definition of code points may be dynamically setup in the GFD Session Description. An example of the semantics for the code point is provided in Table 4 below.

TABLE 4

Code Point Semantics

| Element or Attribute Name | Use | Description |
|---|---|---|
| CodePoint | | defines the Code Points in a GFD session |
| @value | M | defines the value of the code point in the GFD session as provided in the CP value of the GFD packet header. The value may be between 1 and 455. The value 0 is reserved. |
| @maximumTransferLength | M | specifies the maximum transfer length in bytes of any object delivered with this code point in this GFD session. |

TABLE 4-continued

Code Point Semantics

| Element or Attribute Name | Use | Description |
|---|---|---|
| @constantTransferLength | OD default: 'false' | specifies if all objects delivered by this code point have constant transfer length. If this attribute is set to TRUE, all objects may have transfer length as specified in the @maximumTransferLength attribute. |
| @contentLocationTemplate | O | specifies a template to generate the Content-Location of the entity header. |
| EntityHeader | 0 . . . 1 | specifies a full entity header in the format as defined in RFC2616, section 9.1. The entity header applies for all objects that are delivered with the value of this code point. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @

A code point may include a @contentLocationTemplate attribute. The value of @contentLocationTemplate attribute may contain one or more of the identifiers as listed in Table 6 below. In each URL, the identifiers from Table 5 may be replaced by the substitution parameter defined in Table 5. Identifier matching is case-sensitive. If the URL contains unescaped $ symbols which do not enclose a valid identifier then the result of URL formation is undefined. The format of the identifier is also specified in Table 6 below.

TABLE 6

Identifiers for URL templates

| $<Identifier>$ | Substitution parameter | Format |
|---|---|---|
| $$ | Is an escape sequence, i.e. "$$" is replaced with a single "$" | not applicable |
| $PacketID$ | This identifier is substituted with the value of the packet_id of the associated MMT flow. | The format tag may be present. If no format tag is present, a default format tag with width = 1 may be used. |
| $OI$ | This identifier is substituted with the Object Identifier of the corresponding GFD packet. | The format tag may be present. If no format tag is present, a default format tag with width = 1 may be used. |

Each identifier may be suffixed, within the enclosing '$' characters following this prototype: "% 0[width]d". The "width" parameter is an unsigned integer that provides the minimum number of characters to be printed. If the value to be printed is shorter than this number, the result may be padded with zeros. The value may not be truncated even if the result is larger. The @contentLocationTemplate may be authored such that the application of the substitution process results in valid URIs. Strings outside identifiers may only contain characters that are permitted within URLs according to RFC 3986, incorporated by reference herein.

GFD operation: the GFD mode of MMTP delivers regular files. When delivering regular files, the object represents a file. If the code point defined in the GFD Session description contains entity-header fields or entity-header fields that can be generated, then all of these entity-header fields may apply to the delivered file.

FIG. 8 illustrates an exemplary structure for a GFD mode packet structure 800 in accordance with various embodiments of the present disclosure. The payload packets sent using MMTP may include a GFD payload header and a GFD Payload as illustrated in FIG. 8. In some special cases a GFD sender may need to produce packets that do not contain any payload. This may be required, for example, to signal the end of a session. The GFD payload header has a variable size. In the GFD payload header, all integer fields are carried in "big-endian" or "network order" format, that is, the most significant byte (octet) first. Bits designated as "padding" or "reserved" (r) are set to 0 by senders and ignored by receivers. Unless otherwise noted, numeric constants in these examples are in decimal form (base 10).

In this exemplary embodiment, the semantics and length of each field of the GFD mode packet structure 800 are provided as follows: the length field 802 includes 16 bits and indicates the size of entire payload including this field; the S field 804 is 1 bit long and indicates the number of full 32-bit words in the TOI field (the TOI field is 32*S+16*H bits in the length field 802, e.g., the length is either 0 bits, 16 bits, 32 bits, or 48 bits); the H field 806 is 1 bit long and allows the TOI field lengths to be multiples of a half-word (16 bits), while ensuring that the aggregate length of the start_offset and TOI fields is a multiple of 32 bits; the L field 808 is 1 bit long and indicates whether this is the last delivered packet for this object; the B field 810 is 1 bit long and indicates whether this packet contains the last byte of the object; the code point (CP) field 812 is 8 bits long and includes an opaque identifier that is passed to the packet payload decoder to convey information on the packet payload. The mapping between the code point and the actual codec is defined on a per session basis and communicated out-of-band as part of the session description information. The Object Metadata (M) field 814 is 1 bit long and this flag indicates whether the object metadata provided as part of the payload or not. When set to 1, the payload is MIME entity, where the header may contain at least the content-type and the content-location headers. The reserved field (RES) is 3 bits long and is set to 0; the start_offset field 818 (16+32*O+ 16*H) indicates the location of the current payload data in the object; and the GFD payload field 820 includes the GFD payload.

The object identifier may be set to a unique identifier of the generic object that is being delivered. The mapping between the object identifier and the object information (such as URL and MIME type) may be done explicitly or implicitly. For example, a sequence of DASH segments may use the segment index as the object identifier and a numerical representation identifier as the packet_id. This mapping may also be performed using a signaling message.

For the GFD Payload, the bytes of the object are referenced such that byte 0 is the beginning of the object and byte T−1 is the last byte of the object with T the transfer length of the object. The data carried in the payload of an MMTP packet may consist of a consecutive portion of the object starting from the beginning of byte X and ending at the beginning of byte X+Y where X is the value of start_offset field in the GFD packet header and Y is the length of the payload in bytes. Y may not be carried in the packet but framing may be provided by the underlying transport protocol.

The MMT protocol (MMTP) is an application layer transport protocol designed to efficiently and reliably deliver MMT packages. MMTP can be used for delivery of both timed and non-timed media data. It supports several features, such as media multiplexing, network jitter calculation, which are essential to deliver content composed of various types of coded media data. MMTP may run on top of the existing protocols, e.g. UDP and IP. In the present disclosure, a specific carriage of the data formatted other than MMT payload format as is required. A single MMTP packet may carry exactly one MMT payload. MMTP assumes that the sending entity performs congestion control and thus congestion control function is not specified in this specification. This is because MMTP runs on top of UDP/IP and will be used by a wide variety of applications this function is left to implementation of sending entities.

MMTP supports the multiplexing of different assets over a single MMT packet flow. MMTP delivers multiple types of data in the order of consumption at the receiving entity to help the synchronization between different types of media data without introducing a large delay or requiring large buffer. MMTP also supports the multiplexing of media data and signaling messages within a single packet flow. A single MMT payload may be carried in only one MMT packet.

MMT protocol defines two packetization modes, GFD mode and MPU mode. The GFD mode (e.g., download mode) defines a mode packetizing media data based on the size of the payload to be carried and the MPU mode (e.g., streaming mode) defines a mode packetizing media data based on the type of data to be carried in the payload. MMT protocol supports mixed use of packets with two different modes in a single delivery session. A single packet flow of MMT packets can be arbitrary composed of payloads with two types. MMTP provides the structure and definitions to calculate and remove jitter introduced by the underlying delivery network, so that constant delay for data stream can be achieved. By using the timestamp field in the packet header, jitter can be precisely calculated without requiring any additional signaling information and protocols.

Figure 9:
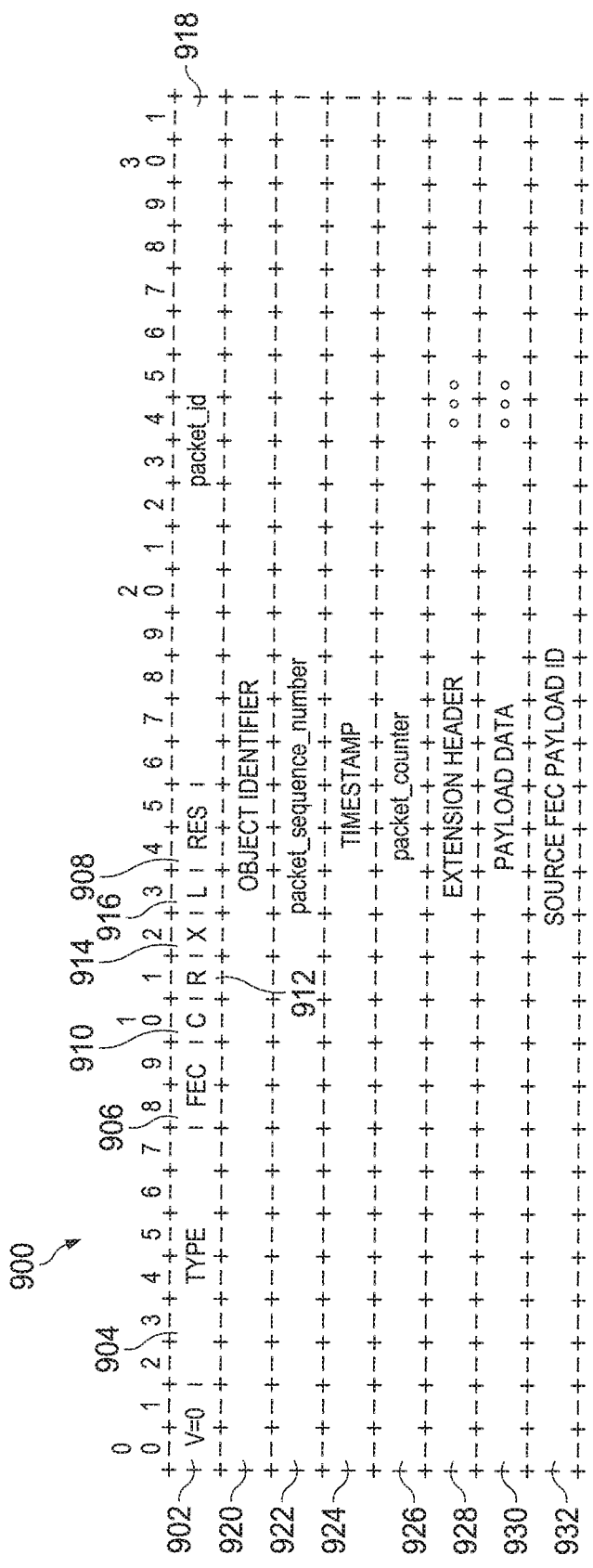
FIG. 9 illustrates an exemplary structure for an MMTP packet in accordance with various embodiments of the present disclosure.

FIG. 9 illustrates an exemplary structure for an MMTP packet 900 in accordance with various embodiments of the present disclosure. In this exemplary embodiment, the semantics and length of each field of the MMTP packet 900 are provided as follows: version (V) field 902 is 2 bits long and indicates the version number of the protocol. This field may be set to '00' to comply with this specification. The type field (object type) 904 is 6 bits. This field indicates the payload type, i.e., the mode. Payload type values are provided in Table 6 below. For the fragmentation and aggregation indication data unit of each payload type is provided in Table 6 below.

TABLE 6

Payload type and definition of data unit

| Value | Payload Type | Definition of payload data | Semantics of 'object_identifier' |
|---|---|---|---|
| 0x00 | MPU | format-aware fragments of MPU | MPU sequence number |
| 0x01 | Generic Object | a generic object such as a complete MPU or an object of another type | TOI |
| 0x02 | signaling message | a single complete signaling message | |
| 0x03 | repair symbol | a single complete repair symbol | |
| 0x04~0x1F | ISO reserved for future use | | |
| 0x20~0x3F | Reserved for private use | | |

Continuing with the semantics and length of each field of the MMTP packet 900, the FEC type (FEC) field 906 is 2 bits long and indicates the type of FEC scheme used to protect MMT packets. An example of values and associated descriptions for this field is listed in Table 7 below.

TABLE 7

Valid values of FEC_type

| Value | Description |
|---|---|
| 0 | MMT packet without AL-FEC protection |
| 1 | MMT packet with AL-FEC protection (FEC source packet) |

TABLE 7-continued

Valid values of FEC_type

| Value | Description |
|---|---|
| 2 | MMT packet for repair symbol(s) (FEC repair packet) |
| 3 | Reserved for future use |

Continuing with the semantics and length of each field of the MMTP packet 900, the reserved (RES) field 908 is 3 bits long and is reserved for future use; the packet_counter_flag (C) field 910 is 1 bit long and a '1' indicates that the packet_counter field is present; the RAP_flag (R) field 912 is 1 bit long and, when set to '1', indicates that the payload contains a random access point to the data stream of that data type, the extension_flag (X) field 914 is 1 bit long and a '1' indicates that the header_extension field is present, the last (L) field 916 is 1 bit long and a '1' indicates that the last one of the packets with same value of the object_identifier field; the packet_id field 918 is 16 bits long and includes an integer value assigned to each asset to distinguish packets of one asset from another. Separate values are assigned to signaling messages and FEC repair flows. The packet_id is unique throughout the lifetime of the delivery session and for all MMT flows delivered by the same MMT sending entity. The mapping between the packet_id and the asset_id is signaled by the MMT Package Table as part of a signaling message. For AL-FEC, the mapping between packet_id and the FEC repair flow is provided in the AL-FEC message. The packet_id is unique for all MMT packet flows delivered by the same MMT sending entity.

Continuing with the semantics and length of each field of the MMTP packet 900, the object_identifier field 920 is 32 bits long and includes an identifier of the application layer object from the current payload is extracted. The exact semantics and usage of this field 920 may depend on the type of the payload. The packet_sequence_number field 922 is 32 bits long and includes an integer value that is scoped by the packet_id and starts from arbitrary value incremented by one for each MMT packet. This value wraps around to '0' after its maximum value is reached. The timestamp field 924 is 32 bits long and specifies the time instance of MMT packet delivery. The NTP time is used in timestamp as specified as the "short-format" in clause 6 of IETF RFC5905, NTP version 4, which is incorporated by reference herein. This timestamp specifies the time at the first bit of MMT packet. The packet_counter field 926 is 32 bits long and includes an integer value for counting the MMT packet. The value is incremented by the sending of an MMT packet and is different from the value packet_id. This field 926 starts from arbitrary value incremented by one for each MMT packet sent. The value of the field 926 wraps around to '0' after its maximum value.

Figure 10:
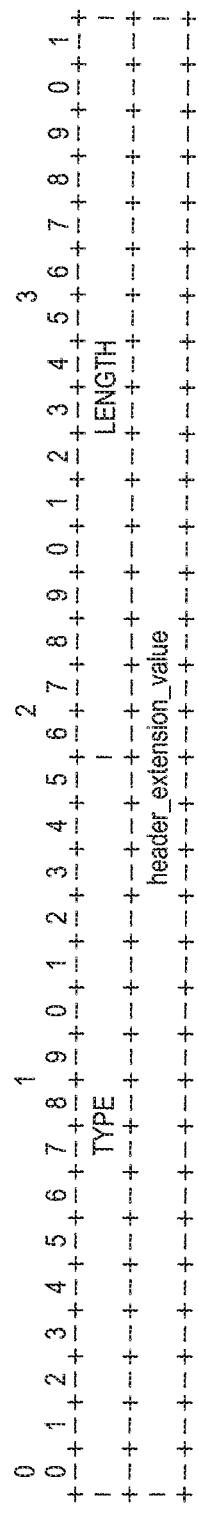
FIG. 10 illustrates an exemplary structure for header extension in accordance with various embodiments of the present disclosure.

The extension_header field 928 is includes user-defined information. The header extension mechanism is provided to allow for proprietary extensions to the payload format to enable applications and media types that require additional information to be carried in the payload format header. The header extension mechanism is designed in such a way that it may be discarded without impacting the correct processing of the MMT payload. The extension header in the field 928 may have the format as illustrated in FIG. 10, which illustrates an exemplary structure for header extension 1000 in accordance with various embodiments of the present disclosure.

Continuing with the semantics and length of each field of the MMTP packet 900, the payload data field 930 includes the payload data; and the source FEC payload ID field 932 is 2 bits long and may be used only when the value of FEC type is set to '1'. An MMT packet with FEC type=1 may be used for AL-FEC protection and after AL-FEC protection this field may be added to the MMT packet.

In these illustrative embodiments, the present disclosure provides a harmonized structure for MMTP with two layers enabling indication of specific parts of an MPU for fragmented delivery. As a first layer, the payload type (e.g., download mode, streaming mode, GPU mode, MPU mode, etc.) is signaled by type (or object type) field in the MMTP Header. As the second layer, the delivery data unit type is signaled by the DU_type field in the MPU mode payload header. Accordingly, the embodiments of the present disclosure provide a transmission protocol supporting both downloading and streaming in the same protocol by integrating the GPU mode and MPU mode within the MMTP.

Figure 11:
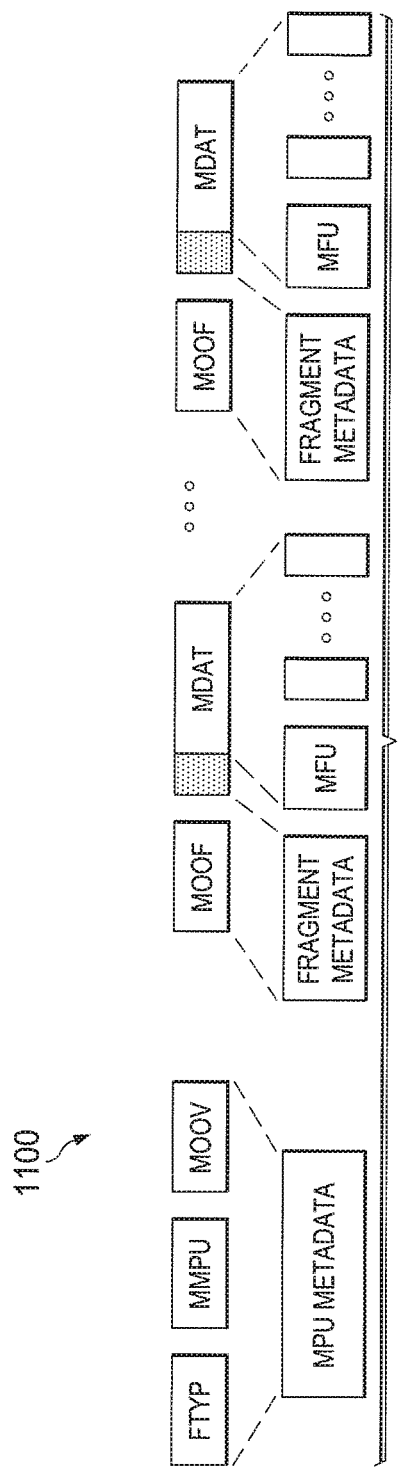
FIG. 11 illustrates an exemplary diagram of packetization of timed media data in accordance with various embodiments of the present disclosure.

FIG. 11 illustrates an exemplary diagram 1100 of packetization of timed media data in accordance with various embodiments of the present disclosure. The packetization of an MPU that contains timed media may be performed in an MPU format-aware and/or MPU format agnostic mode. In the MPU format agnostic mode, the MPU is packetized into data units of equal size (except for the last data unit, of which the size may differ) or a predefined size according to the size of MTU of the underlying delivery network by using GFD. In other words, the packetization of the MPU format agnostic mode may only consider the size of data to be carried in the packet. The type field for the MMTP packet header is set to 0x00 to indicate that the packetization is format agnostic mode.

In the MPU format-aware mode the packetization procedure takes into account the boundaries of different types of data in MPU to generate packets by using MPU mode. The resulting packets carry delivery data units of either MPU metadata, movie fragment metadata, or MFU. The resulting packets may not carry more than two different types of delivery data units. The delivery data unit of MPU metadata is assigned the DU_type 0x01. The MPU metadata includes the 'ftyp' box, the 'mmpu' box, the 'moov' box, and any other boxes that are applied to the whole MPU. The delivery data unit of movie fragment metadata consists of the 'moof' box and the 'mdat' box header (excluding any media data) and is assigned the DU_type 0x02. The media data, MFUs in mdat box of MPU, is then split into multiple delivery data units of MFU in a format aware way. This may, for example, be performed with the help of the MMT hint track. The MFU may include 1) only media data, 2) media data with a sequence number, and 3) media data with some control information. Each MFU is prepended the MFU header, which has the syntax and semantics. The MFU header is followed by the media data of the MFU.

Figure 12:
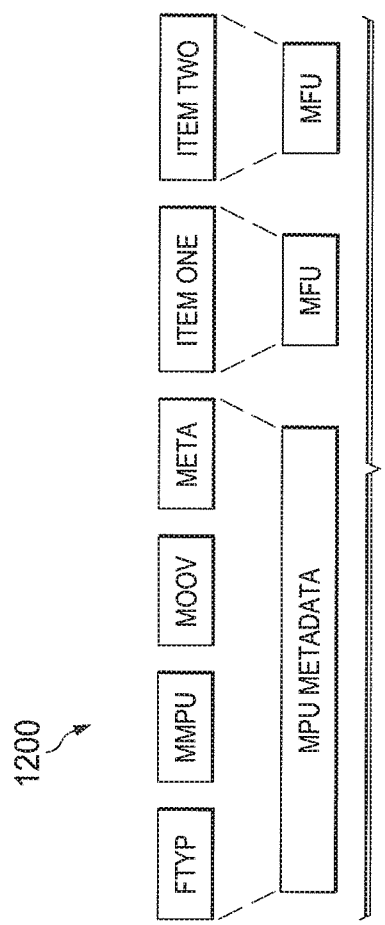
FIG. 12 illustrates an exemplary diagram of packetization of non-timed media data in accordance with various embodiments of the present disclosure.

FIG. 12 illustrates an exemplary diagram 1200 of packetization of non-timed media data in accordance with various embodiments of the present disclosure. The packetization of non-timed media data may also be performed in two different modes. In the MPU format agnostic mode, the MPU is packetized into delivery data units of equal size (except for the last data unit, of which the size may differ) or a predefined size according to the size of MTU of the underlying delivery network by using GFD mode. The type field of MMTP packet is set to 0x00 to indicate that the packetization is generic. In the format agnostic mode, the MPU is packetized into the packet containing delivery data units of either MPU metadata or MFU by using MPU mode.

The MPU metadata contains the 'ftyp' box, the 'moov' box, the 'meta' box and any other boxes that are applied to whole MPU. Each delivery data unit of MFU contains a single item of the non-timed media. Each item of the non-timed data is then used to build an MFU. The MFU consists of an MFU header and the non-timed MFU data.

The depacketization procedure is performed at the MMT receiver to obtain the transmitted MPU. The depacketization procedure may operate in one of the following modes, depending on the application needs: an MPU mode, a fragment mode, and a media unit mode. In the MPU mode, the depayloadizer regenerates the full MPU before forwarding the MPU to the application. This mode is appropriate for non-time critical delivery, i.e. the MPU's presentation time as indicated by the CI is sufficiently behind the MPU's delivery time. In the fragment mode, the depayloadizer regenerates a complete fragment including the fragment metadata and the 'mdat' box with media samples before forwarding it to the application. This mode does not apply to non-timed media. This mode is suitable for delay-sensitive applications where the delivery time budget is limited but is large enough to recover a complete fragment. In the media unit mode, the depayloadizer extracts and forwards media units as fast as possible to the application. This mode is applicable for very low delay media applications. In this mode, the recovery of the MPU is not required. The processing of the fragment media data is not required but may be performed to resynchronize. This mode tolerates out of order delivery of the fragment metadata, which may be generated after the media units are generated. This mode applies to both timed and non-timed media.

Using the MFU sequence numbers, receiver is able to detect missing packets and apply any error correction procedures such as FEC or ARQ to recover the missing packets. The payload type may be used by the sender to determine the importance of the payload for the application and to apply appropriate error resilience measures.

Each GFD delivery session may have a GFDT that is local to the given session. A file that is delivered within the GFD session, but not described in the GFDT is not considered a 'file' belonging to the GFD delivery session. An object that is received with an un-mapped code point should be ignored by a GFD receiver.

The files in the GFD session may have to be provided to an application, for example in a composition information document or a media presentation description, as defined in ISO/IEC 23009-1, which is incorporated by reference herein, may refer to the files delivered using MMTP as GFD objects. The file may be referenced through the URI provided or derived from content-location, either provided in-band or as part of the GFD session description. In certain cases, the files have an availability start time in the application. In this case the GFD session may deliver the files such that the last packet of the object is delivered such that it is available latest at the receiver at the availability start time as announced in the application. Applications delivered through the GFD mode may impose additional and stricter requirements on the sending of the files within a GFD session.

Within a session, a sender (e.g., sending entity 101) transmits a sequence of packets within the session. Several objects may be delivered within the same GFD session. If more than one object is to be delivered within a session, then the sender may use the TOI field. In this scenario, each object may be identified by a unique TOI within the session, and the sender may use corresponding TOI for all packets pertaining to the same object. The mapping between TOIs and files carried in a session is described in the GFD session description as well as in the entity-header fields if entity mode delivery is applied.

The GFD header, as discussed above, may be used. The GFD packet header includes a code point field that may be used to communicate to a receiver the settings for information that is established for the session and may even vary during a session. The mapping between settings and code point values is communicated in the GFD session description.

For example, let T>0 be the transfer-length of any object in bytes, the data carried in the payload of a packet consists of a consecutive portion of the object. Then for any arbitrary X and any arbitrary Y>0 as long as X+Y is at most T a packet may be generated. In under this criteria the following may hold: (A) the data carried in the payload of a packet may consist of a consecutive portion of the object starting from the beginning of byte X through the beginning of byte X+Y; (B) the start_offset field in the GFD packet header may be set to X and the payload data may be added into the packet to send; and (C) if X+Y is identical to T, the packet header flag B may be set to 1, else the packet header flag B may be set to 0.

The following exemplary procedure may be used by a sender to deliver an object to generate packets containing start_offset and corresponding payload data. First, the sender sets the byte offset counter X to 0. Then, for the next packets to be delivered set the length in bytes of a payload to a fixed value Y, which is a) reasonable for a packet payload (e.g., ensure that the total packet size does not exceed the MTU), b) such that the sum of X and Y is at most T, and c) such that it is suitable for the payload data included in the packet. The sender then generates a packet according to the rules a-c from above. Then if X+Y is equal to T, the sender sets the packet header flag B to 1, else the sender sets the packet header flag B to 0, increments X=X+Y and returns to generate the packet according to rules a-c.

The order of packet delivery may be arbitrary, but the sender may perform delivery in the absence of other constraints delivery with increasing start_offset number. The transfer length may be unknown prior to sending earlier pieces of the data. In this situation, T may be determined later. However, this does not affect the sending process above. Additional packets may be sent following the rules in (A)-(C) from above. In this situation, the B flag may only be set for the packet that contains the last portion of the object.

The GFD Session Description contains one or multiple code points identified by different code point values. Upon receipt of each packet, the receiver (e.g., one or more of receiving entities 110-116) may proceeds with the following steps. First, the receiver parses the packet header and verifies that it is a valid header. If it is not valid, then the packet may be discarded without further processing. Second, the receiver parses the code point value and verifies that the GFD session description contains a matching code point. If it is not valid, then the packet may be discarded without further processing. Third, the receiver processes the remainder of the packet, which includes interpreting the other header fields appropriately and using the source_offset and the payload data to reconstruct the corresponding object as follows: a) the receiver can determine from which object a received packet was generated by the session information, and if present, by the TOI carried in the payload header; b) upon receipt of the first packet for an object, the receiver uses the Maximum Transfer Length received as part of the Object Transmission Information to determine the maximum length T' of the object; c) the receiver allocates space for the T' bytes that the object may require; d) the receiver computes the length of the payload, Y, by subtracting the packet header length from the total length of the received packet; e) the receiver allocates a Boolean array RECEIVED[0 . . . T'−1] with all T entries initialized to false to track received object symbols. The receiver keeps receiving packets for the object block as long as there is at least one entry in RECEIVED still set to false or until the application decides to give up on this object. f) For each received packet for the object (including the first packet), the steps to be taken to help recover the object are as follows: i) let X be the value of the source_offset field in the GFD packet header of the packet and let Y be the length of the payload, Y, computed by subtracting the packet header length from the total length of the received packet; ii) the receiver copies the data into the appropriate place within the space reserved for the object and sets RECEIVED[X . . . X+Y−1]=true; iii) if all T entries of RECEIVED are true, then the receiver has recovered the entire object; and g) once the receiver receives a packet with the B flag set to 1, it can determine the transfer length T of the object as X+Y of the corresponding packet and adjust the a Boolean array RECEIVED[0 . . . T'−1] to RECEIVED[0 . . . T−1].

GFD CodePoint: the information about the files delivered using the GFD mode is indicated in the MP Table if the asset_scheme_code is set to "GeneralFile". The generic objects that are delivered using the GFD mode may be grouped together as an MMTP flow identified by the packet_id. Packets that carry generic objects using the GFD mode may be marked with type 1 in the MMTP packet header type field. The GFD table defines one or multiple code points. The code point table is provided in Table 8 below.

TABLE 8

CodePoint Syntax for MMT Signaling

| Syntax | Value | No. of bits | Mnemonic |
|---|---|---|---|
| CodePoint ( ) { | | | |
|   table_id | | 8 | uimsbf |
|   version | | 8 | uimsbf |
|   length | | 16 | uimsbf |
|   value | N1 | 8 | uimsbf |
|   maximumTransferLength | N2 | 48 | uimsbf |
|   constantTransferLength | N3 | 8 | uimsbf |
|   contentLocationTemplateSize | N4 | 8 | uimsbf |
|   contentLocationTemplate[N5] | N5 | 8 * N5 | char |
|   EntityHeaderSize | N6 | 16 | uimsbf |
|   EntityHeader[N7] | N7 | 8 * N7 | char |
| } | | | |

While various embodiments described herein discuss MMT data communication, it is noted that the various embodiments of the present are not limited to MMT communications. For example, the fixed delay and buffer size determinations may be applied to any suitable type of data or media content delivery and/or any suitable type of transmission system in accordance with the principals of the present disclosure.

Figure 13:
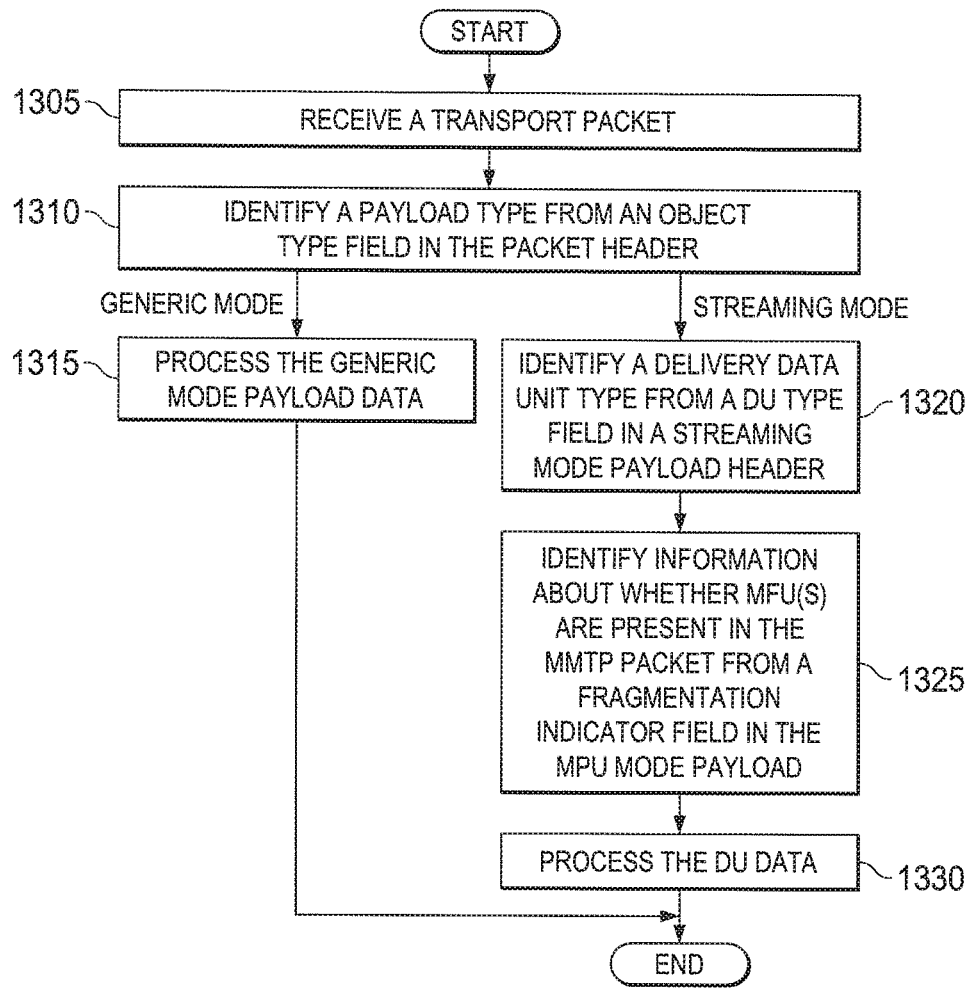
FIG. 13 illustrates a process for processing a transport packet at a receiving entity in accordance with an illustrative embodiment of the present disclosure.

FIG. 13 illustrates a process for processing a transport packet at a receiving entity in accordance with an illustrative embodiment of the present disclosure. For example, the process depicted in FIG. 13 may be performed by some or all of the receiving entities 110-116 in FIG. 1. The process may also be implemented by the electronic device 1500 in FIG. 15.

The process begins with the receiving entity receiving a transport packet (step 1305). The receiving entity then identifies a payload type from a field indicating the payload type in the packet header (step 1310). For example, in step 1310, the receiving entity may parse the packet header and to identify the value in the object type field, such as field 904 in FIG. 9, and identifying the corresponding payload type in accordance with Table 6. If the payload type is the generic mode, the receiving entity processes the generic mode payload data (step 1315).

If the payload type is streaming mode, the receiving entity identifies a delivery data unit type from a field indicating the delivery data unit type in a streaming mode payload header (step 1320). For example, in step 1320, the receiving entity may identify the delivery data unit type of the DU data in the transport packet such as the type of data in MMT payload.

For example, the receiving entity may parse the streaming mode payload header, such as illustrated in FIG. 4, to identify the value in the DU_type field 404 to identify the delivery data unit type in accordance with Table 1. For example, the DU data may include one of: a complete MPU, MPU metadata, movie fragment metadata, a timed MFU, a non-timed MFU, a signaling message, or recovery symbols based on the value included in the DU type field.

Thereafter, the receiving entity identifies information about whether MFU(s) are present in the transport packet from a fragmentation indicator field in the streaming mode payload header (step 1325). For example, in step 1325, the transport packet includes one or more fragments of an MPU arranged as MFUs. The transport packet may include a plurality of delivery data units, each delivery data unit including a DU header and DU data. The receiving entity may determine whether the DU data includes: one or more delivery data unit headers and complete delivery data units, a delivery data unit header and a first fragment of a delivery data unit, a fragment of the delivery data unit that is neither the first nor the last part, or a last fragment of the delivery data unit based on the value in the fragmentation indicator field in accordance with Table 2.

The receiving entity then processes the DU data (step 1330). For example, in step 1330, the receiving entity may process the DU data according to the identified delivery data unit type. The receiving entity may process and decode the DU data to display the media via a user interface to the user associated with the receiving entity.

Figure 14:
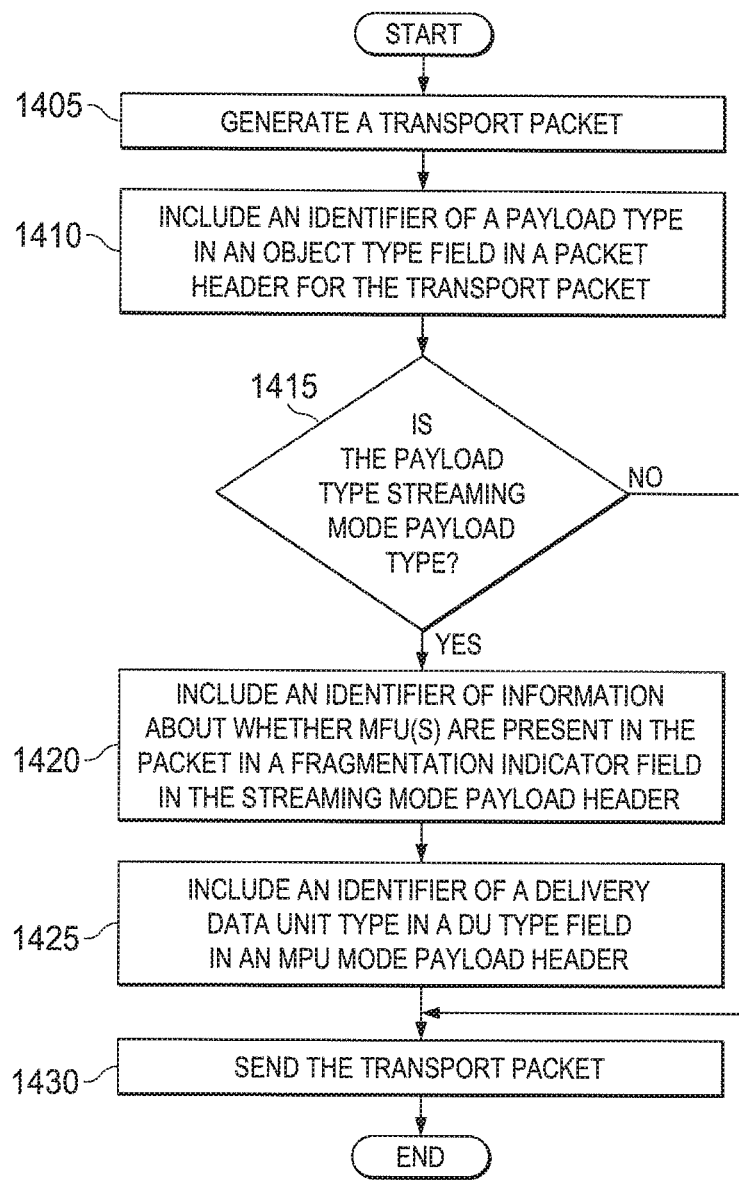
FIG. 14 illustrates a process for generating a transport packet at a sending entity in accordance with an illustrative embodiment of the present disclosure.

FIG. 14 illustrates a process for generating a transport packet at a sending entity in accordance with an illustrative embodiment of the present disclosure. For example, the process depicted in FIG. 14 may be performed by the sending entity 101 in FIG. 1. The process may also be implemented by the electronic device 1500 in FIG. 15.

The process begins with the sending entity generating a transport packet (step 1405). For example, in step 1405, the sending entity may generate the packet to include downloading or streaming data. The sending entity may include a plurality of delivery data units with each delivery data unit including a DU header and DU data.

The sending entity then includes an identifier of a payload type in a field indicating the payload type in a packet header for the transport packet (step 1410). For example, in step 1410, the sending entity may include a value corresponding to object type, such as in Table 6, in a type field of the packet header, such as in field 904 in FIG. 9.

The sending entity then determines whether the payload type is a streaming mode payload type (step 1415). If the payload type is a type other than the streaming mode, for example, the generic (GFD) mode, the receiving entity then generates the transport packet according to the payload time and proceeds to step 1430 to send the generated transport packet.

If, however, the payload type is a streaming mode payload type, the sending entity includes an identifier of a delivery data unit type in a field indicating the delivery data unit type in a streaming mode payload header (step 1420). For example, in step 1420, the sending entity may include a value of corresponding to the delivery data unit type for the packet in a field in the streaming mode payload header, such as illustrated by the DU_type field 404 of the streaming mode payload header in FIG. 4 accordance with the delivery data unit types Table 1. For example, the DU type field may indicate that the DU data includes one of: a complete MPU, MPU metadata, movie fragment metadata, a timed MFU, a non-timed MFU, a signaling message, or recovery symbols based on the value included.

Thereafter, the sending entity includes an identifier of information about whether MFU(s) are present in the packet in a fragmentation indicator field in the streaming mode payload header (step 1425). For example, in step 1425, the transport packet may include one or more fragments of an MPU arranged as MFUs. The sending entity may indicate that the DU data includes: one or more delivery data unit headers and complete delivery data units, a delivery data unit header and a first fragment of a delivery data unit, a fragment of the delivery data unit that is neither the first nor the last part, or a last fragment of the delivery data unit based on a value included in the fragmentation indicator field in accordance with Table 2.

The sending entity then sends the generated transport packet (step 1430). For example, in step 1430, the sending entity may send the transport packet to a receiving entity to receive and process the transport packet, for example, according to the process illustrated in FIG. 13.

Although FIGS. 13 and 14 illustrate examples of processes for processing and generating transport packets by receiving and sending entities, respectively, various changes could be made to FIGS. 13 and 14. For example, while shown as a series of steps, various steps in each figure could overlap, occur in parallel, occur in a different order, or occur multiple times.

Figure 15:
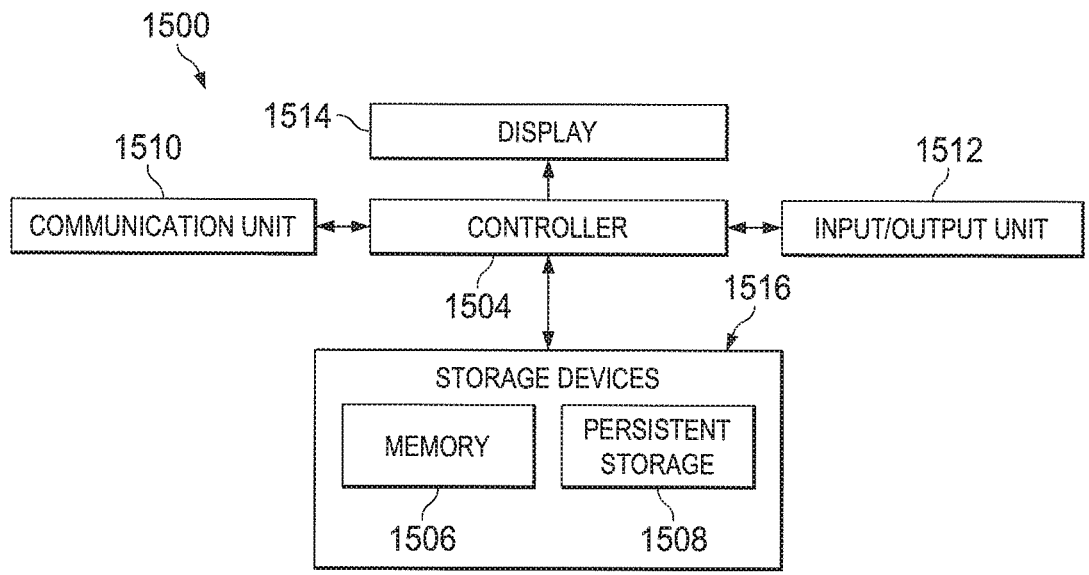
FIG. 15 illustrates an example electronic device in which various embodiments of the present disclosure may be implemented.

FIG. 15 illustrates an example electronic device 1500 in which various embodiments of the present disclosure may be implemented. In this example, the electronic device 1500 includes a controller 1504, a memory 1506, a persistent storage 1508, a communications unit 1510, an input/output (I/O) unit 1512, and a display 1514. In these illustrative examples, electronic device 1500 is also one example of the sending entity 101 and/or the receiving entity 110 in FIG. 1.

Controller 1504 is any device, system or part thereof that controls at least one operation, such a device may be implemented in hardware, firmware or software, or some combination of at least two of the same. For example, the controller 1504 may include a hardware processing unit, processing circuitry, media coding and/or decoding hardware and/or software, and/or software program configured to control operations of the electronic device 1500. For example, controller 1504 process instructions for software that may be loaded into memory 1506. Controller 1504 may include a number of processors, a multi-processor core, or some other type of processor, depending on the particular implementation. Further, controller 1504 may be implemented using a number of heterogeneous processor systems in which a main processor is present with secondary processors on a single chip. As another illustrative example, controller 1504 may include a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Memory 1506, in these examples, may be, for example, a random access memory or any other suitable volatile or non-volatile storage device. For example, persistent storage 1508 may contain one or more components or devices. Persistent storage 1508 may be a hard drive, a flash memory, an optical disk, or some combination of the above. The media used by persistent storage 1508 also may be removable. For example, a removable hard drive may be used for persistent storage 1508.

Communications unit 1510 provides for communications with other data processing systems or devices. In these examples, communications unit 1510 may include a wireless (cellular, WiFi etc.) transmitter, receiver, and/or transceiver, a network interface card and/or any other suitable hardware for sending and/or receiving communications over a physical or wireless communications medium. Communications unit 1510 may provide communications through the use of either or both physical and wireless communications links.

Input/output unit 1512 allows for input and output of data with other devices that may be connected to or a part of the electronic device 1500. For example, input/output unit 1512 may include a touch panel to receive touch user inputs, a microphone to receive audio inputs, a speaker to provide audio outputs, and/or a motor to provide haptic outputs. Input/output unit 1512 is one example of a user interface for providing and delivering media data (e.g., audio data) to a user of the electronic device 1500. In another example, input/output unit 1512 may provide a connection for user input through a keyboard, a mouse, external speaker, external microphone, and/or some other suitable input/output device. Further, input/output unit 1512 may send output to a printer. Display 1514 provides a mechanism to display information to a user and is one example of a user interface for providing and delivering media data (e.g., image and/or video data) to a user of the electronic device 1500.

Program code for an operating system, applications, or other programs may be located in storage devices 1516, which are in communication with the controller 1504 through the bus system 1502. In some embodiments, the program code is in a functional form on the persistent storage 1508. These instructions may be loaded into memory 1506 for processing by controller 1504. The processes of the different embodiments may be performed by controller 1504 using computer-implemented instructions, which may be located in memory 1506. For example, controller 1504 may perform processes for one or more of the modules and/or devices described above.

In some embodiments, various functions described above are implemented or supported by a computer program product that is formed from computer-readable program code and that is embodied in a computer-readable medium. Program code for the computer program product may be located in a functional form on a computer-readable storage device that is selectively removable and may be loaded onto or transferred to electronic device 1500 for processing by controller 1504. In some illustrative embodiments, the program code may be downloaded over a network to persistent storage 1508 from another device or data processing system for use within electronic device 1500. For instance, program code stored in a computer-readable storage medium in a server data processing system may be downloaded over a network from the server to electronic device 1500. The data processing system providing program code may be a server computer, a client computer, or some other device capable of storing and transmitting program code.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting media contents, the method comprising:

identifying at least one media processing unit (MPU) comprising one or more media fragment units (MFUs) based on media data of the media contents; and transmitting a transport packet including a packet header and a payload comprising payload data generated from the at least one MPU, wherein the packet header comprises a type field indicating a type of the payload data and a random access point (RAP) flag indicating that the payload contains a RAP to a data stream of a media data type, wherein, in case that the type field is set to a first value indicating that the payload data is a media-aware fragment of the MPU, the payload consists of a first payload header for a MPU mode prior to the payload data, the first payload header comprising a data type field indicating a fragment type of the payload data, a fragmentation indicator (f_i) comprising information about fragmentation of the payload data, an aggregation flag (A) indicating that more than one delivery data unit is in the payload, and a fragment counter (frag_count) indicating a number of payload containing fragments of a same delivery data unit succeeding the payload, and wherein, in case that the type field is set to a second value indicating that the payload data is a generic object including the MPU completely, the payload consists of a second payload header for a generic file delivery (GFD) mode prior to the payload data, the second payload header comprising a L field indicating that the transport packet is a last delivered packet of the generic object, a B field indicating that the transport packet comprising a last byte of the generic object, a code point field indicating an opaque identifier that is passed a packet payload decoder to convey information on the payload, a start offset indicating a location of the payload data in the generic object, and an object metadata field indicating whether object metadata is provided as part of the payload, wherein, when the object metadata field is a value of one, the object metadata field indicates the payload data is a mime entity including at least a content-type header and a content-location header.

2. The method of claim 1, wherein the generic object in the payload data comprises a complete MPU.

3. The method of claim 1, wherein the fragment type indicated by the data type field is one of MPU metadata, movie fragment metadata, and MFU.

* * * * *